(12) United States Patent
Livaich

(10) Patent No.: US 8,202,561 B2
(45) Date of Patent: Jun. 19, 2012

(54) TOMATO-BASED ALCOHOL COMPOSITIONS AND METHODS OF PREPARATION

(75) Inventor: Anthony Livaich, Wethersfield, CT (US)

(73) Assignee: Mott's LLP, Rye Brook, NY (US)

( * ) Notice: Subject to any disclaimer, the term of this patent is extended or adjusted under 35 U.S.C. 154(b) by 497 days.

(21) Appl. No.: 11/532,220

(22) Filed: Sep. 15, 2006

(65) Prior Publication Data

US 2007/0065561 A1 Mar. 22, 2007

Related U.S. Application Data

(60) Provisional application No. 60/717,656, filed on Sep. 16, 2005, provisional application No. 60/761,848, filed on Jan. 25, 2006, provisional application No. 60/783,093, filed on Mar. 16, 2006, provisional application No. 60/819,787, filed on Jul. 10, 2006, provisional application No. 60/832,827, filed on Jul. 24, 2006.

(51) Int. Cl.
A23L 2/02 (2006.01)
C12G 3/00 (2006.01)

(52) U.S. Cl. .......................... 426/599; 426/592; 426/600

(58) Field of Classification Search .................. None
See application file for complete search history.

(56) References Cited

U.S. PATENT DOCUMENTS

| | | |
|---|---|---|
| 1,746,657 A | 2/1930 | Kemp |
| 1,955,849 A * | 4/1934 | Finley ............................ 426/573 |
| 2,115,815 A * | 5/1938 | Johnson ......................... 426/492 |
| 2,764,486 A * | 9/1956 | Stevens et al. ............. 426/330.5 |
| 3,212,281 A | 10/1965 | McKay |
| 3,492,131 A | 1/1970 | Schlatter et al. |
| RE26,959 E | 9/1970 | Conrad et al. |
| 3,676,154 A | 7/1972 | Glasser |
| 3,764,710 A * | 10/1973 | Inagami et al. ............... 426/591 |
| 3,788,862 A * | 1/1974 | Hoover .......................... 426/540 |
| 3,878,310 A | 4/1975 | Field et al. |
| 3,892,877 A * | 7/1975 | Wagner et al. ................ 426/241 |
| 4,031,266 A * | 6/1977 | Mitchell et al. .............. 426/599 |
| 4,109,017 A | 8/1978 | Grampp et al. |
| 4,279,931 A | 7/1981 | Verwaerde et al. |
| 4,416,904 A | 11/1983 | Shannon |
| 4,556,576 A | 12/1985 | Gaehring |
| 4,619,834 A | 10/1986 | Zanno et al. |
| 4,770,894 A * | 9/1988 | Usui et al. .................... 426/655 |
| 4,840,806 A | 6/1989 | Hyldon et al. |
| 4,906,573 A | 3/1990 | Barney et al. |
| 4,988,530 A | 1/1991 | Hoersten et al. |
| 4,992,282 A * | 2/1991 | Mehansho et al. ............. 426/72 |
| 5,108,774 A * | 4/1992 | Mills et al. ..................... 426/599 |
| 5,248,515 A | 9/1993 | Payton et al. |
| 5,321,930 A * | 6/1994 | Poole ............................. 53/371.2 |
| 5,389,387 A * | 2/1995 | Zuniga et al. ................... 426/74 |
| 5,503,863 A | 4/1996 | Brain et al. |
| 5,702,737 A | 12/1997 | Guzinski et al. |
| 5,866,190 A * | 2/1999 | Barey ............................ 426/573 |
| 5,866,191 A | 2/1999 | Mancuso |
| 6,020,016 A * | 2/2000 | Castleberry .................... 426/590 |
| 6,027,751 A * | 2/2000 | Romick et al. .................. 426/61 |
| 6,099,889 A * | 8/2000 | Johnson ........................ 426/599 |
| 6,723,369 B2 | 4/2004 | Burgess |
| 6,833,148 B1 * | 12/2004 | Yamamoto et al. ........... 426/321 |
| 6,835,402 B1 | 12/2004 | Clark et al. |
| 7,008,652 B2 | 3/2006 | Effler |
| 2002/0155211 A1 * | 10/2002 | Yokoo et al. ................... 426/599 |
| 2002/0172738 A1 * | 11/2002 | Young, III ........................ 426/15 |
| 2002/0197364 A1 | 12/2002 | Shyong Pan |
| 2003/0129282 A1 | 7/2003 | Solorio et al. |
| 2004/0115329 A1 | 6/2004 | Tamiya et al. |
| 2004/0126474 A1 * | 7/2004 | Letourneau et al. .......... 426/599 |
| 2005/0169970 A1 * | 8/2005 | Aquino ......................... 424/439 |
| 2006/0035002 A1 * | 2/2006 | Romeo .......................... 426/615 |

FOREIGN PATENT DOCUMENTS

| | | |
|---|---|---|
| CN | 1354247 | 6/2002 |
| GB | 2203166 A | 10/1988 |
| JP | 0759553 | 3/1995 |
| WO | 03057817 A1 | 7/2003 |

OTHER PUBLICATIONS

No Author Listed: "The Virtual Bar "La Mamila" 2000.http://www.thevirtualbar.com/cgi-bin/dspdrink?RecNo=10226" 2000.*
No Author Listed: "Alcohol Content of Some Common Drinks" "http://web.archive.org/web/20020722082555/http://www.upei.ca/~stuserv/alcohol/alcoholcontent1.htm" Jul. 2002.*
No Author Listed: "Fruit and Vegetable Processing" "http://web.archive.org/web/20010111222100/http://www.fao.org/docrep/V5030E/V5030E0r.htm" 2001.*
Marshall et al. 2003 "Ice Cream" Kluwer Academic/Plenum Publishers 6th ed. p. 75.*
Furia, CRC Handbook of Food Additives, 1972 Second Edition vol. 1, p. 610 (3 pages including cover pages).*
Bates et al. FAO Agricultural Service Bulletin 146 "Principles and Practice of Small and medium scale fruit juice processing" 2001 pp. 1-7.*

(Continued)

*Primary Examiner* — Humera Sheikh
*Assistant Examiner* — Felicia King
(74) *Attorney, Agent, or Firm* — Cox Smith Matthews Incorporated

(57) ABSTRACT

The present invention relates to tomato-based concentrates and tomato-flavored alcoholic compositions, which include the concentrates. More specifically, in some embodiments, the present invention provides a concentrate including tomato solids and one or more flavoring agents. The present invention also provides methods of preparing ready-to-drink beverage compositions.

8 Claims, No Drawings

OTHER PUBLICATIONS

SU677145; Jan. 7, 1981; XP-002412481; "Conc. non-alcoholic drink—prepd. by mixing tomato and plum pastes with beetroot juice, sugar syrup opt. citric acid and water"; Abstract Only (1 page).
XP002412473; printed Dec. 19, 2006; "Whiskey Willy's Bloody Mary Mix"; http://www.whiskeywills.com/products; (2 pages).
XP-002412474; printed Dec. 19, 2006; "Dave's Gourmet Original Bloody Mary Mix"; http://www.hotsauceworld.com/dagoorblmami; (2 pages).
XP-002412475; printed Dec. 19, 2006; "Beer BBQ Sause"; http://www.beercollections.com/Gourmet-Beer-Foods/BBQ-Sauce; (2 pages).
XP-002412476; printed Dec. 19, 2006; "Utterly Sleep Deprived"; http://civpro.blogs.com/civil_procedure/2004/07/utterly_sleep_d; (2 pages).
JP2006-094855; Apr. 13, 2006; "Method for Producing Alcoholic Beverage".
Written Opinion of the International Searching Authority; International Application No. PCT/US2006/036041; International Filing Date Sep. 15, 2006; 10 pages.
International Search Report; International Application No. PCT/US2006/036041; International Filing Date Sep. 15, 2006; 5 pages.
Kirk-Othmer Encyclopedia of Chemical Technology, "Chlorine to Colors for Foods, Drugs, and Cosmetics", $2^{nd}$ Edition, vol. 5, 1964, pp. 857-884.
Meilgaard et al., "Sensory Evaluation Techniques", Third Edition, CRC Press, 1999 (20 pages).
Stone et al., "Sensory Evaluation Practices", Second Edition, Academic Press, Inc. 1993 (6 pages).
CODEX STAN 57; Codex Standard for Processed Tomato Concentrates; CODEX STAN 57-1981; Codex Alimentarius vol. 5A-1994 (6 pages).
http://www.feebrothers.com/RecipeQueryFiles.asp?Ingredient=Bloody%20Mary%20Mix Recipe for Bloody Brew; printed Sep. 25, 2006; 2 pages.
http://www.feebrothers.com/Product.asp?Category=6 Bloody Mary Mix; printed Sep. 25, 2006; 2 pages.
http://www.webtender.com/cgi-bin/search?name= &ingr=%2B%22tomato+juice%22+%2 . . . Search for drinks with ingredient(s) '+"tomato juice"+beer'; printed Nov. 22, 2005; 1 page.
http://www.webtender.com/db/drink/1480 Recipe for Red Eye; printed Mar. 26, 2007 (1 page).
http://www.webtender.com/cgi-bin/search?name=&ingr=clamato &what=drink&show=25 . . . Search for drinks with ingredient(s) 'clamato'; printed Nov. 21, 2005; 2 pages.
http://www.webtender.com/db/drink/5540 Recipe for Acapulco Twister; printed Mar. 26, 2007; 1 page.
http://www.webtender.com/db/drink/1830 Recipe for Clam Eye; printed Mar. 26, 2007; 1 page.
http://www.webtender.com/db/drink/1290 Recipe for La Mamila; printed Mar. 26, 2007; 1 page.
http://www.webtender.com/db/drink/5149 Recipe for Shellshock; printed Mar. 26, 2007; 1 page.
http://www.webtender.com/db/drink/5647 Recipe for the Twister; printed Mar. 26, 2007; 1 page.
http://www.barnonedrinks.com/search/index.html Drink Recipe Search; printed Nov. 21, 2005; 2 pages.
http://www.barnonedrinks.com/recipes/cocktails/f/flaminglayrnx.html?search=1 Recipe for Flaming Layrnx; printed Mar. 26, 2007; 2 pages.
JP2005176727A; Jul. 7, 2005; Machine Translation (13 pages).
JP62253368; Nov. 5, 1987; Machine Translation (6 pages).
Kazu, JP 62253368 Derwent Abstract Nov. 1997.
U.S. Appl. No. 11/532,247, filed Sep. 15, 2006.
U.S. Appl. No. 12/487,752, filed Jun. 19, 2009.
USPTO, Non-Final Office Action for U.S. Appl. No. 11/532,220, dated Sep. 15, 2009, 16 pages.
U.S. Appl. No. 11/532,247 Non-Final Office Action dated: Apr. 12, 2010, 19 pages.
Gutcho "Alcoholic Beverage Processes" Food Technology Review No. 29, p. 3 and p. 238 (4 pages), May 2, 1977.
Furia Handbook of Food Additives vol. 1, pp. 242-243 (4 pages), 1972.
Office Action dated Oct. 27, 2010 in related U.S. Appl. No. 11/532,247 (15 pages).
Request for Continued Examination filed on Jan. 27, 2011 in related U.S. Appl. No. 11/532,247 (26 pages).
Office Action dated Mar. 28, 2011 in related U.S. Appl. No. 11/532,247 (10 pages).
Response to Office Action filed on Jun. 28, 2011 in related U.S. Appl. No. 11/532,247 (44 pages).
Interview Summary dated Jun. 21, 2011 in related U.S. Appl. No. 11/532,247 (3 pages).
Office Action dated Sep. 13, 2011 in related U.S. Appl. No. 11/532,247 (23 pages).
Letter filed on Dec. 21, 2007 in related U.S. Appl. No. 11/532,247 (11 pages).
Preliminary Amendment filed on Dec. 21, 2007 in related U.S. Appl. No. 11/532,247 (8 pages).
Amendment filed on May 21, 2009 in related U.S. Appl. No. 11/532,247 (17 pages).
Amendment filed on Dec. 9, 2009 in related U.S. Appl. No. 11/532,247 (12 pages).
Response to Office Action filed on Aug. 12, 2010 in related U.S. Appl. No. 11/532,247 (16 pages).
Dr. Murli Dharmadhikari, "Midwest Grape and Wine Industry Institute: Apple Wine," http://www.extension.iastate.edu/Wine/Resources/applewine.htm (15 pages), Last updated Aug. 27, 2007.
Kwok et al., "Passion Fruit Starch and Effect on Juice Viscosity," Journal of Food Science, vol. 39, issue 3, pp. 431-433, May 1974 (Abstract) (1 page).
"Dextrose Starch Agar," http://www.bd.com/ds/technicalcenter/inserts/Dextrose_Starch_Agar.pdf (2 pages), Mar. 20, 2006 date believed to be available.
Tomato and Clam Juice by Herdez (http://web.archive.org/web/20040725042601/http:/www.mexgrocer.com/6400-herdez.html) 2004.
21 CFR § 155.191 "Tomato Concentrates", Code of Federal Regulations, Title 21, vol. 2 (4 pages) Revised as of Apr. 1, 2008.
21 CFR § 156.145 "Tomato Juice", Code of Federal Regulations, Title 21, vol. 2 (2 pages) Revised as of Apr. 1, 2008.

* cited by examiner

US 8,202,561 B2

TOMATO-BASED ALCOHOL COMPOSITIONS AND METHODS OF PREPARATION

CROSS REFERENCE TO RELATED APPLICATIONS

This application claims the benefit of U.S. Provisional Application Ser. Nos. 60/717,656 filed 16 Sep. 2005, 60/761,848 filed 25 Jan. 2006, 60/783,093 filed 16 Mar. 2006, 60/819,787 filed 10 Jul. 2006, and 60/832,827 filed 24 Jul. 2006. These provisional applications are incorporated herein by reference.

FIELD

The present invention includes tomato-based concentrates and compositions incorporating same. More specifically, the present invention includes tomato-flavored alcoholic compositions, such as beer and spirits, which include the tomato-based concentrates. The present invention also relates to methods for preparing tomato-flavored alcoholic compositions.

BACKGROUND

Consumers often enjoy non-alcoholic, tomato-flavored beverages, such as tomato juice and related commercial products. These products often are consumed for their nutritional content, including vitamins and minerals, as well as their sweet, fruity and sometimes spicy flavor. For instance, a variety of commercially marketed tomato juice products include pepper flavors to provide a spicy or zesty taste to the beverage.

Alcoholic beverages, particularly beer, are also popular for their taste and the social experience associated with consuming such beverages. A variety of different alcohols, such as beers are commercially available, from light beers to stouts. Many different taste profiles are provided by these numerous beer varieties, which may be selected depending on an individual consumer's preference. Some consumers may prefer beers that impart a slightly sweet, fruity or even a spicy taste, which is not provided by currently available beers.

Although consumers may have individually poured tomato juices into their beer in the past, such combinations do not provide shelf-stable beverage products. Moreover, tomato juices have high water and low solids content, unlike concentrated tomato products, such as tomato pastes.

There is a need, therefore, for beers and other alcoholic beverages that have a slightly sweet and fruity taste or even a spicy flavor profile, which may be provided by a concentrated tomato-based composition with or without spices. There also is a need for tomato-flavored alcoholic compositions, particularly beer and spirits, which provide a dominant tomato flavor. Such beverages may be ready-to-drink and shelf stable.

SUMMARY

In some embodiments, there is provided a beverage concentrate comprising a tomato component having a natural tomato soluble solids content of about 20 to about 40% by weight, wherein the concentrate comprises about 20 to about 65% soluble solids by weight.

In some embodiments, there is provided a beverage concentrate comprising ethyl alcohol and a tomato component having a natural tomato soluble solids content of about 20 to about 40% by weight, wherein the concentrate comprises about 20 to about 65% soluble solids by weight.

Some embodiments provide a beverage concentrate comprising a hops flavor and a tomato component having a natural tomato soluble solids content of about 20 to about 40% by weight, wherein the concentrate comprises about 20 to about 65% soluble solids by weight.

In some embodiments, there is provided a beverage concentrate comprising ethyl alcohol, a hops flavor, and a tomato component having a natural tomato soluble solids content of about 20 to about 40% by weight, wherein the concentrate comprises about 20 to about 65% soluble solids by weight.

Some embodiments provide a beverage concentrate comprising a shellfish flavor and about 10 to about 30 weight percent of a tomato component having a natural tomato soluble solids content of about 20 to about 40% by weight, wherein the concentrate comprises about 20 to about 65% soluble solids by weight.

Some embodiments provide a beverage concentrate comprising about 10 to about 30 weight percent of a tomato component having a natural tomato soluble solids content of about 20 to about 40% by weight, about 10 to about 50 weight percent ethyl alcohol, a hops flavor, and a flavoring agent selected from the group consisting of savory flavors, citrus flavors, spicy flavors, shellfish flavors, and combinations thereof.

Some embodiments provide a beverage composition comprising an alcoholic composition, and a concentrate comprising a tomato component having a natural tomato soluble solids content of about 20 to about 40% by weight, wherein the concentrate comprises about 20-65% soluble solids by weight.

In some embodiments, there is provided a beverage composition comprising a tomato-flavored composition, and a hops-flavored composition, wherein the beverage composition is a pre-mixed, ready-to-drink beverage product.

In some embodiments, there is provided a bottled, ready-to-drink tomato-flavored beverage product comprising beer and tomato paste, wherein the beverage comprises about 3 to about 20% soluble solids by weight.

In some embodiments, there is provided a beverage composition comprising a stabilized dispersion of tomato paste in a beer composition.

In some embodiments, there is provided a ready-to-drink beverage composition comprising about 0.3 to about 1 weight percent natural tomato soluble solids, about 0.1 to about 8 weight percent ethyl alcohol, and a flavoring agent selected from the group consisting of hops flavors, savory flavors, citrus flavors, spicy flavors, shellfish flavors, and combinations thereof.

In some embodiments, there is provided a ready-to-drink beverage composition comprising about 0.3 to about 1 weight percent natural tomato soluble solids, about 0.1 to about 8 weight percent ethyl alcohol, and a shellfish flavor.

In some embodiments, there is provided a fountain beverage composition, comprising: tomato solids; ethyl alcohol; a flavoring agent selected from the group consisting of savory flavors, citrus flavors, spicy flavors, shellfish flavors, hops flavors, and combinations thereof; and water comprising dissolved gas; wherein the beverage comprises about 2 to about 5 volumes of the dissolved gas; and wherein the water comprising dissolved gas is added at the point of consumption.

In some embodiments, there is provided a method of preparing a tomato-flavored alcoholic composition, comprising: providing an alcoholic composition, and dispersing a tomato-flavored concentrate in the alcoholic composition, wherein the tomato-flavored concentrate comprises about 20 to about 65% soluble solids by weight, and wherein the weight ratio of tomato-flavored concentrate to alcoholic composition is about 1:20 to about 20:1.

In some embodiments, there is provided a method of preparing a tomato-flavored alcoholic beverage, comprising: blending one part by weight of a beverage concentrate with about 5 to about 10 parts by weight of water comprising dissolved gas, wherein the beverage concentrate comprises tomato solids, ethyl alcohol, and a flavoring agent selected from the group consisting of savory flavors, citrus flavors, spicy flavors, shellfish flavors, hops flavors, and combinations thereof.

In some embodiments, there is provided a method of preparing a tomato-flavored alcoholic beverage, comprising: blending one part by weight of a beverage concentrate with about 5 to about 10 parts by weight of water comprising dissolved gas; wherein the beverage concentrate comprises a tomato component having a natural tomato soluble solids content of about 20 to about 40% by weight, about 10 to about 50 weight percent ethyl alcohol, and a flavoring agent selected from the group consisting of savory flavors, citrus flavors, spicy flavors, shellfish flavors, hops flavors, and combinations thereof; and wherein the water comprising dissolved gas comprises about 2 to about 5 volumes of a gas selected from the group consisting of carbon dioxide, nitrogen, nitrous oxide, oxygen, and combinations thereof.

In some embodiments, there is provided a method of oxidatively stabilizing beer, comprising combining beer with a tomato-flavored concentrate to produce a ready-to-drink beverage comprising at least 0.1 weight percent natural tomato soluble solids, and bottling the ready-to-drink beverage.

These and other embodiments are described in detail below.

DETAILED DESCRIPTION

As will be described in detail herein, some embodiments relate to tomato-flavored compositions, particularly beverage concentrates and ready-to-drink beverages, which may include tomato paste or puree and, optionally, various flavoring agents. In some embodiments, a shellfish flavor, such as clam flavor, is included. In some embodiments, a hops flavor is included. In some embodiments, other flavoring agents may be incorporated instead of or in addition to the shellfish flavor and/or the hops flavor, including savory flavors, citrus flavors, spicy flavors, shellfish flavors, and combinations thereof. The beverage concentrates may be combined with beverage compositions, particularly, alcoholic beverage compositions, to form tomato-flavored alcoholic beverages, such as tomato-flavored beer. The tomato-flavored compositions may be stably dispersed in the alcoholic compositions, thereby imparting a desirable shelf life to the product.

As used herein the transitional term "comprising," (also "comprises," etc.) which is synonymous with "including," "containing," or "characterized by," is inclusive or open-ended and does not exclude additional, unrecited elements or method steps, regardless of its use in the preamble or the body of a claim.

The term "food-grade acid," as used herein, encompasses any acid that is acceptable for use in edible compositions.

Tomato-Flavored Compositions

Embodiments described herein provide tomato-flavored compositions, such as concentrates, particularly beverage concentrates. The concentrates may include a tomato component having a natural tomato soluble solids content of about 20 to about 40% by weight. Suitable tomato components include tomato pastes, and relatively concentrated tomato purees. The concentrate also may include one or more flavoring agents, including shellfish flavors, savory flavors, citrus flavors, spicy flavors, and hops flavors. As described in detail below, the concentrates may be used to prepare stabilized tomato-flavored alcoholic compositions, such as tomato-flavored beer.

As the tomato-flavored composition may be in a concentrated form, the composition may contain some amount of tomato solids. Typically, tomato pastes have a natural tomato soluble solids content of at least about 24% by weight, more specifically, about 24 to about 36% by weight, and tomato purees typically have a natural tomato soluble solids content of about 8 to about 24% by weight.

In some embodiments described herein, the amount of soluble solids in the beverage concentrate may range from about 3 to about 65% by weight of the concentrate. Within this range, the amount of soluble solids may be at least 20%, or at least 25%, or at least 30%, or at least 35%, or at least 38%. Also within this range, the amount of soluble solids may be up to about 60%, or up to about 55%. In some more highly concentrated embodiments described herein, the amount of soluble solids may range from about 20 to about 65% by weight of the concentrate. Alternatively, in some less concentrated embodiments, the amount of soluble solids may range from about 3 to about 20% by weight of the concentrate.

The solids contained in the tomato concentrate may include, without limitation, solids derived from the processed tomato, such as tomato pulp, tomato seeds, portions of tomato skins, tomato fibers and pectin, which is naturally occurring in the tomato fruit. Other solids may include shellfish flavor, spices, salts, sweetening agents, and food-grade acids, among others, as described in detail below. As such, the total solids contained in the tomato concentrate may include soluble and insoluble solids.

To measure the amount of soluble solids in a tomato concentrate or a ready-to-drink beverage, a refractometer can be used. A refractometer reading provides a Brix measurement and the results are expressed as "degrees Brix" or "Brix." For tomato concentrates and ready-to-drink beverages, natural tomato soluble solids (sometimes referred to herein as "NTSS" or "tomato solids") can be determined using a refractometer as described in AOAC method 970.59. To measure the amount of insoluble solids, a centrifuge can be used. Upon centrifugation, the weight percent insoluble solids can be determined by measuring the weight of sediment. Alternatively, the insoluble solids may be expressed as a volume percent and determined by separating the solids via centrifuge and measuring the volume percent solids in the centrifuge tube.

The tomato concentrate may be derived from any type of tomatoes, including, without limitation, red, yellow, or green tomatoes, and combinations thereof. The tomato concentrate may be formed from tomatoes subject to a hot break or cold break process. In particular, in both processes, tomatoes may be macerated and passed through conventional equipment to separate out seeds, skins and other undesired solids. The composition then may be concentrated by conventional techniques. In hot break processes, the tomatoes typically are heated during maceration or immediately thereafter to deactivate enzymes that may degrade the product and decrease the viscosity of the product. In cold break processes, the tomatoes typically are processed at lower temperatures than hot break. A hot break process accordingly may provide a thicker tomato product than those produced by a cold break process. For instance, tomato pastes produced by a hot break process may have a solids content of about 20 to about 40% by weight, or about 24 to about 36% by weight, or about 31% by weight, whereas products derived using a cold break process may have lower solids contents.

In some embodiments, the tomato component may be a tomato paste derived from a hot break method at temperatures of about 85 to about 102° C. (about 185 to about 215° F.). A 0.838 millimeter (0.033 inch) finishing screen may be used to determine the fineness of the paste. The tomato paste may have a natural tomato soluble solids content of about 31% by weight. Other properties of the tomato paste may include a pH of about 4.1 to about 4.5 and an apparent density (at 20° C.) of about 1.126 to about 1.136 kilogram/liter.

Additionally, in some embodiments, the tomato component may be subject to homogenization conditions, such as high pressure homogenization, thereby providing a homogenous composition. The concentrate and/or final beverage also may be pasteurized, as described in more detail below.

In some embodiments, the tomato component may be present in an amount of about 3 to about 65% by weight, based on the total weight of the concentrate, more specifically about 10 to about 30% by weight. In some embodiments, the tomato component may be present in an amount sufficient to provide a natural tomato soluble solids content of about 4 to about 8 weight percent in the concentrate as a whole.

In addition to the tomato component, the concentrate may, optionally, comprise juice, solids, or a combination thereof derived from a fruit or vegetable selected from the group consisting of beets, carrots, celery, apples, peppers, onions, parsley, lettuce, watercress, arugula, spinach, pineapples, oranges, guavas, mangos, papayas, and combinations thereof.

In some embodiments, the concentrate may comprise ethyl alcohol. Such a concentrate may be used, for example, by mixing with water (with or without a dissolved gas) to form a ready-to-drink beverage.

As mentioned above, in some embodiments, the concentrate also may include a shellfish flavor. The shellfish flavor may include, but is not limited to, clam, oyster, shrimp, lobster, crab, mollusk, mussels, scallops, and combinations thereof. The shellfish flavor may be in any suitable form for incorporation into the tomato paste or puree, such as a powder, paste or liquid. In some particular embodiments, the shellfish flavor may be clam broth, which may be dried.

The shellfish flavor may be present in amounts of about 0 to about 5% by weight of the concentrate, more specifically about 0.01 to about 5% by weight of the concentrate.

In some embodiments, the concentrate also may include a flavoring agent, particularly a spicy flavor. Suitable spicy flavors include, but are not limited to, red pepper flavor, black pepper flavor, horseradish flavor, wasabi flavor, jalapeno pepper flavor, chipotle pepper flavor, other chile flavors, and combinations thereof. In some embodiments, a blend of any of these spicy flavors may be employed.

The spicy flavor may be present in amounts of about 0.1 to about 10% by weight of the concentrate.

Other suitable flavoring agents include, without limitation, savory flavors and citrus flavors. Savory flavors can include those that impart meaty, fried, fatty, roasted, allium, smoky, and cheesy notes. More specifically, savory flavors can include, but are not limited to, onion flavor, garlic flavor, celery seed, anchovy flavor, ginseng, taurine, guarana, Worcestershire flavor, soy sauce flavor, yeast extract flavor, beef flavor, dill, carrot, parsley, beet, lettuce, watercress, arugula, spinach, other seafood flavors, and combinations thereof. Citrus flavors can include, but are not limited to, lemon, lime, orange, grapefruit, or tangerine, and the like, and combinations thereof. In addition to spicy, savory, and citrus flavors, the total flavor system can include ancillary flavors such as molasses, vinegar, honey, coffee, nutty flavors, and combinations thereof.

Some embodiments also may include a sweetening agent. Sweetening agents may include sugar sweeteners, sugarless sweeteners or combinations thereof.

Suitable sugar sweeteners for use in the concentrate generally include monosaccharides, disaccharides, and polysaccharides such as but not limited to, sucrose (sugar), dextrose, maltose, dextrin, xylose, ribose, glucose, mannose, galactose, fructose (levulose), lactose, invert sugar, fructooligosaccharide syrups, partially hydrolyzed starch, corn syrup solids, such as high fructose corn syrup, and mixtures thereof.

Suitable sugarless sweetening agents for use in the concentrate include sugar alcohols (or polyols) such as, but not limited to, sorbitol, xylitol, mannitol, galactitol, maltitol, hydrogenated isomaltulose (isomalt), lactitol, erythritol, hydrogenated starch hydrolysate, stevia and mixtures thereof.

Suitable hydrogenated starch hydrolysates include those disclosed in U.S. Pat. No. RE 26,959 of Conrad et al., and U.S. Pat. No. 4,279,931 of Verwaerde et al., and various hydrogenated glucose syrups and/or powders which contain sorbitol, hydrogenated disaccharides, hydrogenated higher polysaccharides, or mixtures thereof. Hydrogenated starch hydrolysates are primarily prepared by the controlled catalytic hydrogenation of corn syrups. The resulting hydrogenated starch hydrolysates are mixtures of monomeric, dimeric, and polymeric saccharides. The ratios of these different saccharides give different hydrogenated starch hydrolysates different properties. Mixtures of hydrogenated starch hydrolysates, such as LYCASIN™, a line of commercially available products manufactured by Roquette Freres of France, and HYSTAR™, a line of commercially available products manufactured by Lonza, Inc., of Fairlawn, N.J., also may be useful.

In some embodiments, the sweetening agent may be present in amounts of about 0.01 to about 25% by weight of the concentrate.

Some embodiments may include high-intensity sweeteners in the concentrate. Without being limited to particular sweeteners, representative categories and examples include:

(a) water-soluble sweetening agents such as dihydrochalcones, monellin, steviosides, glycyrrhizin, dihydroflavenol, dihydroflavonol, and sugar alcohols such as sorbitol, mannitol, maltitol, and L-aminodicarboxylic acid aminoalkenoic acid ester amides, such as those disclosed in U.S. Pat. No. 4,619,834 of Zanno et al., and mixtures thereof;

(b) water-soluble artificial sweeteners such as soluble saccharin salts, i.e., sodium or calcium saccharin salts, cyclamate salts, the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Acesulfame-K), the free acid form of saccharin, and mixtures thereof;

(c) dipeptide based sweeteners, such as L-aspartic acid derived sweeteners, such as L-aspartyl-L-phenylalanine methyl ester (Aspartame) and materials described in U.S. Pat. No. 3,492,131 of Schlatter, L-alpha-aspartyl-N-(2,2,4,4-tetramethyl-3-thietanyl)-D-alaninamide hydrate (Alitame), N—[N-(3,3-dimethylbutyl)-L-aspartyl]-L-phenylalanine 1-methyl ester (Neotame), methyl esters of L-aspartyl-L-phenylglycerine and L-aspartyl-L-2,5-dihydrophenyl-glycine, L-aspartyl-2,5-dihydro-L-phenylalanine; L-aspartyl-L-(1-cyclohexen)-alanine, and mixtures thereof;

(d) water-soluble sweeteners derived from naturally occurring water-soluble sweeteners, such as chlorinated derivatives of ordinary sugar (sucrose), e.g., chlorodeoxysugar derivatives such as derivatives of chlorodeoxysucrose or chlorodeoxygalactosucrose, known, for example, under the product designation of Sucralose; examples of chlorodeoxysucrose and chlorodeoxygalactosucrose derivatives include but are not limited to: 1-chloro-1'-deoxysucrose; 4-chloro-4-deoxy-alpha-D-galactopyranosyl-alpha-D-fructofuranoside, or 4-chloro-4-deoxygalactosucrose; 4-chloro-4-deoxy-alpha-D-galactopyranosyl-1-chloro-1-deoxy-beta-D-fructofuranoside, or 4,1'-dichloro-4,1'-dideoxygalactosucrose; 1',6'-dichloro1',6'-dideoxysucrose; 4-chloro-4-deoxy-alpha-D-galactopyranosyl-1,6-dichloro-1,6-dideoxy-beta-D-fructofuranoside, or 4,1',6'-trichloro-4,1',6'-trideoxygalactosucrose; 4,6-dichloro-4,6-dideoxy-alpha-D-galactopyranosyl-6-chloro-6-deoxy-beta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galactopyranosyl-1,6-dichloro-1,6-dideoxy-beta-D-fructofuranoside, or 4,6,1',6'-tetrachloro4,6,1',6'-tetradeoxygalacto-sucrose; and 4,6,1',6'-tetradeoxy-sucrose, and mixtures thereof;

(e) protein based sweeteners such as thaumaoccous danielli (Thaumatin I and II); and (f) the naturally occurring sweetener monatin (2-hydroxy-2-(indol-3-ylmethyl)-4-aminoglutaric acid) and its derivatives.

The intense sweetening agents may be used in many distinct physical forms well known in the art to provide an initial burst of sweetness and/or a prolonged sensation of sweetness. Without being limited thereto, such physical forms include free forms, such as spray dried, powdered, beaded forms, encapsulated forms, and mixtures thereof. In general, an effective amount of intense sweetener may be utilized to provide the level of sweetness desired, and this amount may vary with the sweetener selected. The exact range of amounts for each type of sweetener may be selected by those skilled in the art.

In some embodiments, the concentrate may include optional additives such as salts, food-grade acids, coloring agents (colorants, colorings), preservatives, ascorbic acid (Vitamin C), which may be added to maintain color, energy-boosting agents, such as caffeine, vitamins, such as niacin (Vitamin $B_3$), riboflavin (Vitamin $B_2$) and thiamin (Vitamin $B_1$), potassium chloride, and the like, and combinations thereof.

Suitable salts for use in the concentrate include, but are not limited to, monosodium glutamate, potassium chloride, sodium chloride, and combinations thereof.

Suitable food-grade acids for use in the concentrate include, but are not limited to, acetic acid, adipic acid, ascorbic acid, butyric acid, citric acid, formic acid, fumaric acid, glyconic acid, lactic acid, malic acid, phosphoric acid, oxalic acid, succinic acid, tartaric acid and combinations thereof.

Coloring agents, such as pigments, may be used in amounts effective to produce the desired color. The colorants may also include natural food colors and dyes suitable for food, drug and cosmetic applications. These colorants are known as F.D.& C. dyes and lakes. The materials acceptable for the foregoing uses are preferably water-soluble. An illustrative nonlimiting example is the azo dye known as F.D.& C. Red No. 40 (or "Allura red"), which is 6-hydroxy-5-[(2-methoxy-5-methyl-4-sulfophenyl)azo]-2-naphthalenesulfonic acid. A recitation of F.D.& C. colorants and their corresponding chemical structures may be found in the Kirk-Othmer Encyclopedia of Chemical Technology, 3rd Edition, in volume 5 at pages 857-884.

Any suitable preservatives for use in food and beverage products may be incorporated into the tomato concentrates. Examples of suitable preservatives for use in the concentrate include, but are not limited to, sodium benzoate, potassium sorbate, and combinations thereof.

One embodiment is a concentrate comprising a tomato paste, a savory flavor, a spicy flavor, a citrus flavor, and, optionally, a shellfish flavor. In other embodiments, a concentrate comprising a tomato paste, and, optionally, a shellfish flavor can be further flavored with a savory flavor alone, a spicy flavor alone, or a citrus flavor alone. In still other embodiments, a concentrate comprising a tomato paste, and, optionally, a shellfish flavor can be flavored with binary combinations of savory, spicy, and citrus flavors. In still other embodiments, a concentrate comprising a tomato paste, and, optionally, a shellfish flavor can be flavored with savory, spicy, and citrus flavors. The tomato paste may be, for example, a hot break tomato paste (that is, a tomato paste formed using a hot break process) comprising about 24 to about 36 weight percent tomato solids. The concentrate may incorporate the tomato paste in an amount such that the concentrate comprises about 4 to about 8 weight percent tomato solids, based on the total weight of the concentrate.

One embodiment is a tomato-flavored concentrate comprising tomato solids; a hops flavor; and a flavoring agent selected from the group consisting of savory flavors, citrus flavors, spicy flavors, shellfish flavors, and combinations thereof. The tomato-flavored concentrate may, optionally, further comprise juice, solids, or a combination thereof derived from beets, carrots, celery, apples, peppers, onions, parsley, lettuce, watercress, arugula, spinach, pineapples, oranges, guavas, mangos, papayas, and the like, and combinations thereof.

One embodiment is a beverage concentrate comprising ethyl alcohol and a tomato component having a natural tomato soluble solids content of about 20 to about 40% by weight, wherein the concentrate comprises about 20 to about 65% soluble solids by weight.

One embodiment is a beverage concentrate comprising a hops flavor and a tomato component having a natural tomato soluble solids content of about 20 to about 40% by weight, wherein the concentrate comprises about 20 to about 65% soluble solids by weight.

One embodiment is a beverage concentrate comprising ethyl alcohol, a hops flavor, and a tomato component having a natural tomato soluble solids content of about 20 to about 40% by weight, wherein the concentrate comprises about 20 to about 65% soluble solids by weight.

One embodiment is a beverage concentrate comprising a shellfish flavor and about 10 to about 30 weight percent of a tomato component having a natural tomato soluble solids content of about 20 to about 40% by weight, wherein the concentrate comprises about 20 to about 65% soluble solids by weight.

One embodiment is a beverage concentrate comprising about 10 to about 30 weight percent of a tomato component having a natural tomato soluble solids content of about 20 to about 40% by weight, about 10 to about 50 weight percent ethyl alcohol, a hops flavor, and a flavoring agent selected from the group consisting of savory flavors, citrus flavors, spicy flavors, shellfish flavors, and combinations thereof.

Tomato-Based Alcoholic and Non-Alcoholic Compositions

Some embodiments of the present invention provide tomato-based alcoholic and non-alcoholic compositions, including tomato-flavored beverage compositions. The beverage composition may be a ready-to-drink ("RTD") tomato-flavored beverage product, such as tomato-flavored beer. The beverage composition may include an alcoholic composition and a tomato-flavored composition, such as one of the tomato concentrates described above. In some embodiments, tomato is the dominant flavor in the beverage. Whether tomato is the dominant flavor in the beverage may be determined using sensory analysis methods known as descriptive analysis techniques. For example, an expert panel may be trained on the various flavors in a beverage and then evaluate the intensities of each type of flavor in the beverage. The most intense flavor is the dominant flavor. Descriptive analysis techniques suitable for this type of analysis include the Spectrum™ method of descriptive analysis is described in Morten Meilgaard, Gail Vance Civille, and B. Thomas Carr, "Sensory Evaluation Techniques", Third Edition, CRC Press, 1999. The Spectrum™ method is a custom design approach meaning that the highly trained panelists who generate the data also develop the terminology to measure the attributes of interest. Further, the method uses intensity scales created to capture the intensity differences being investigated. These intensity scales are anchored to a set of well-chosen references. Using these references helps make the data universally understandable and usable over time. This ability to reproduce the results at another time and with another panel makes the data potentially more valuable than analytical techniques which offer similar reproducibility but lack the ability to fully capture the integrated sensory experiences as perceived by humans. Sensory methods such as descriptive analysis can be conducted on a screening basis or on a full panel basis. When testing is done on a screening basis, there may be fewer panelists and those panelists may use an abbreviated scale such as a 5 point scale for rating the products. When testing is done on a full panel basis, more panelists may be involved and a complete scale such as a 15 point may be used. When choosing whether to use a screening or full panel basis for the testing, sensory scientists consider a range of variables such as cost, time, number of samples, etc. A screening basis may be used when time for generating the data is limited and/or when data from an abbreviated scale will adequately distinguish the samples.

The tomato-flavored composition incorporated into the beverage composition may be a tomato-based product, such as any of the concentrates described above. For instance, in some embodiments, the concentrate may include a tomato paste or tomato puree and a shellfish flavor. In some embodiments, the concentrate itself may have a soluble solids content of about 20 to about 65% by weight of the concentrate, more specifically about 25 to about 65% by weight of the concentrate, still more specifically about 30 to about 65%, even more specifically about 35 to about 65% by weight of the concentrate. The concentrate also may include any of the additives described above.

One embodiment is a beverage composition comprising an alcoholic composition, and a concentrate comprising a tomato component having a natural tomato soluble solids content of about 20 to about 40% by weight, wherein the concentrate comprises about 20-65% soluble solids by weight. The beverage composition may, optionally, comprise a shellfish flavor. The beverage composition may be a ready-to-drink beverage product.

When combined with an alcoholic composition to form a beverage composition, the soluble solids content may decrease due to water contained in the alcoholic composition. Additionally, in some embodiments, the beverage composition may be adjusted by the addition of water or other aqueous solutions. In some embodiments, accordingly, the total soluble solids content of the beverage composition may be about 3 to about 20% by weight of the beverage composition, more specifically about 3 to about 10% by weight.

The tomato-flavored composition, or concentrate, may be present in amounts of about 4 to about 99% by weight of the beverage composition. In some embodiments, the tomato-flavored composition may be present in amounts of about 8 to about 50% by weight.

The "alcoholic composition," as used herein, refers to any alcohol-containing composition, such as alcohol-containing beverages. The term "alcoholic composition" may include both carbonated and non-carbonated compositions. In some embodiments, the level of alcohol contained in the beverage may be about 0.5 to about 20% by weight of the composition. Examples of suitable alcoholic compositions include, but are not limited to, beer, spirits, liqueurs and wines.

In some embodiments, the beverage composition may include a hops-flavored composition, which may or may not contain alcohol. Beer is an example of a suitable hops-flavored composition. Beer may include ales, lagers, porters, and stouts, among others. Beer can be formulated to include a range of alcohol levels. In some embodiments, a beer or beer concentrate with an alcohol content of about 7 to about 10% is brewed and then the alcohol level of the finished beer product is adjusted with water. In some embodiments, the finished beer product contains an adjusted alcohol level of about 3 to about 6% alcohol. Alcoholic or non-alcoholic beer may be employed. Regular or light beer may be employed. "Light" (or "lite") beer typically signifies beers with fewer calories than regular beer. The fewer calories can be attributed to a lower alcohol level. Federal regulations in the U.S. set forth labeling and advertising requirements for "light" beers. The label must include a statement of average analysis, which must disclose the calorie, carbohydrate, protein, and fat content per container or 12 ounce serving. A full description of the labeling requirements is provided in ATF Ruling 80-3.

In addition to hops, the hops-flavored compositions, such as beer or a non-alcoholic hops-flavored composition, also may include any conventional ingredients used in malted beverages, such as, but not limited to water, barley, malt, other grains, yeast, nonmalt adjunct materials, and the like. Adjunct materials may include, without limitation, yellow corn grits, refined corn starch, rice sorghum, barley, wheat, wheat starch, cane and beet sugar (sucrose), rye, oats, potatoes, tapioca (cassava), triticale, and the like. Processed adjuncts also may be included in the compositions, such as, but not limited to, corn, wheat and barley syrups, torrified cereals, cereal flakes and micronized cereals. In some embodiments, processing aids also may be used.

The alcoholic, or hops-flavored, composition may be present in amounts of about 1 to about 96% by weight of the beverage composition. In some embodiments, the alcoholic, or hops-flavored, composition may be present in amounts of about 50 to about 70% by weight. In some embodiments, the concentrate is present in an amount of about 4 to about 99% by weight of the beverage composition, or about 8 to about 50% by weight of the beverage composition.

In some embodiments, the alcoholic, or hops-flavored, composition may be present in a weight ratio with the tomato-flavored composition of about 1:20 to about 20:1. More specifically, the weight ratio of alcoholic, or hops-flavored, composition to tomato-flavored composition may be about 1:1 to about 10:1 in some embodiments. In some embodiments, the weight ratio of alcoholic, or hops-flavored, composition to tomato-flavored composition may be about 2:1 to about 10:1, or about 5:1 to about 10:1.

The beverage composition may comprise any of the optional ingredients discussed above in the context of the beverage concentrate. Such ingredients include fruit and vegetable juices and solids, sweetening agents, salts, food-grade acids, coloring agents, preservatives, and flavoring agents. In preparing the beverage composition, these ingredients are conveniently provides as components of the beverage concentrate, but they may, alternatively or in addition, be provided separately or as part of the alcoholic or hops-flavored composition. Similarly, when the beverage composition comprises a dissolved gas, it may be provided as part of the alcoholic or hops-flavored composition, or separately. Therefore, when the beverage is described as "comprising" an optional component, there is no particular limitation on the source of that component in the beverage.

One embodiment is a ready-to-drink, tomato-flavored alcoholic beverage composition, comprising about 0.3 to about 1 weight percent tomato solids, about 0.1 to about 20 weight percent alcohol ("ethyl alcohol" or "ethanol"), a hops flavor, and at least one flavor selected from savory flavors, spicy flavors, citrus flavors, shellfish flavors, and combinations thereof. Within the above range, the alcohol concentration may be at least about 1 weight percent, or at least about 2 weight percent, or at least about 4 weight percent; it may also be up to about 15 weight percent, or up to about 12 weight percent, or up to about 9 weight percent, or up to about 7 weight percent, or up to about 6 weight percent.

The ready-to-drink beverage may, optionally, further comprise a dissolved gas in an amount of about 2 to about 5 volumes of dissolved gas. Suitable dissolved gases include carbon dioxide, nitrogen, nitrous oxide, oxygen, and combinations thereof.

The ready-to-drink beverage may be prepared by a method comprising mixing a tomato-flavored concentrate (for example, one of the concentrates described above), beer or a beer concentrate, and, optionally, water. The tomato-flavored concentrate may contribute tomato solids, shellfish flavor, savory flavor, spicy flavor and citrus flavor. The beer or beer concentrate may contribute alcohol and hops flavor. Preparing a twelve fluid ounce serving of the ready-to-drink beverage can be as simple as combining 10.5 fluid ounces of beer or light beer with 1.5 fluid ounces of a concentrate, where the concentrate may comprise, for example, a hot break tomato paste, a shellfish flavor, a savory flavor, a spicy flavor, and a citrus flavor, wherein the tomato paste is present in an amount such that the concentrate comprises about 4 to about 8 weight percent natural tomato soluble solids.

The beverage composition may be a pre-mixed, RTD composition, such as a single-serve beverage product. In accordance with other embodiments, an RTD beverage product may be a tomato-flavored beer. The beverage may include beer, tomato paste, clam broth and a spicy flavor. The tomato paste may be present in an amount of about 1 to about 10% by weight of the RTD beverage product. Within this range, the tomato paste amount may be at least about 2%, or up to about 5%.

Additionally, the tomato-flavored composition may be stably dispersed throughout the alcoholic composition. More specifically, in some embodiments, the beverage composition may include a stabilized dispersion of tomato paste, or tomato puree, in a beer or other alcohol-containing composition. As such, the beverage composition may exhibit minimal separation between the tomato-flavored composition and alcoholic composition over time. In accordance therewith, less than about 5% by weight solids (from the tomato-flavored composition) may settle out of the beverage composition over a period of up to about 12 months, particularly a period of about 4 months or 8 months or 12 months, thereby providing a shelf-stable beverage product. In one embodiment, settling may be reduced by adding an effective amount of a settling inhibitor such as, for example, a hydrocolloid such as xanthan gum. This feature is particularly advantageous in carbonated beverages where the beverage is not normally shaken prior to consumption. In some embodiments, the shelf stability may be improved during processing by first mixing the tomato-flavored composition and a non-effervescent, or flat, alcoholic composition until a homogenous mixture is achieved and subsequently adding a gas to the mixture. Suitable gases include carbon dioxide, nitrogen, nitrous oxide, oxygen, and combinations thereof. In one embodiment, the gas is carbon dioxide. The amount of gas used may be about 2 to about 5 volumes. Within this range, the gas amount may be at least about 2.5 volumes, or up to about 4 volumes, or up to about 3.5 volumes.

Some embodiments are directed to methods of preparing the tomato-flavored alcoholic compositions. In accordance with such methods, an alcoholic composition may be provided. The alcoholic composition may be fermented or distilled. Examples of suitable alcoholic compositions include, without limitation, beer, spirits, liqueurs and wine, as discussed above. Alternatively, a non-alcoholic composition may be provided. A tomato-flavored composition, such as one of the concentrates described above, may be added and dispersed in the alcoholic composition. In some embodiments, water or other aqueous solutions may be added to dilute the concentrate. In some embodiments, the concentrate may be mixed with the alcoholic composition in a weight ratio of about 1:20 to about 20:1. Within this range, the weight ratio of the concentrate and the alcoholic composition may be up to about 1:10, or up to about 1:5, or up to about 1:2. One embodiment is a method of preparing a tomato-flavored alcoholic composition, comprising: providing an alcoholic composition; and dispersing a tomato-flavored concentrate in the alcoholic composition, wherein the weight ratio of concentrate to alcoholic composition is about 1:20 to about 20:1. The weight ratio of concentrate to alcoholic composition may be about 1:20 to about 1:1, or about 1:20 to about 1:2, or about 1:20 to about 1:5.

In some embodiments, the tomato-flavored composition may be homogenized prior to and/or after addition to (dispersing in) the alcoholic composition. In some embodiments, the tomato paste or puree alone may be homogenized, prior to addition of other components contained in the concentrate, or the concentrate as a whole may be homogenized. High pressure homogenization may be used in which the tomato solids are mashed under pressure. In general, homogenization processes alter the size and distribution of tomato pulp particles in the composition. More specifically, homogenization may break down and uniformly distribute the tomato pulp particles throughout the composition. In addition, homogenization may modify tomato fibers found in the composition by reducing the length and fraying the ends of the fibrous materials. This may allow the fiber strands to absorb more liquid. Overall, homogenization may produce a more uniform concentrate having increased viscosity. Homogenization accordingly may impart a smoother mouth feel to the concentrate.

In some embodiments, homogenization pressures of about 7 to about 150 megapascals (about 1000 to about 22,000 pounds per square inch (psi)) may be used. Within this range, the homogenization pressure may be at least about 15 megapascals. Any homogenization equipment may be employed, such as equipment available from APV Gaulin, Alfa-Laval, or Niro Soavi. In some embodiments, homogenization equipment that disrupts the cell walls of the biomass may be employed, such as equipment available from Sonic Corporation under the trade name Sonolator.

In some embodiments, the beverage composition as a whole may be homogenized once the tomato-flavored composition has been added to the alcoholic composition. This homogenization step may be employed in addition to the previous homogenization of the tomato-flavored composition or tomato paste or puree alone or in place of such homogenization step. It may be desirable to homogenize the alcoholic composition before the addition of dissolved gas. Once a homogenized mixture of the alcoholic composition and the tomato-flavored composition is achieved, then dissolved gas may be added.

In accordance with some embodiments, the tomato-flavored alcoholic composition also may be pasteurized to sterilize the product by destroying unwanted microorganisms. Although tomato products and beer typically are pasteurized at different temperatures, the beverage compositions described herein may be co-pasteurized at temperatures of about 60 to about 80° C. More specifically, the beverage composition may be pasteurized by heating the composition to about 60 to about 80° C. for about 6 to about 15 minutes in an aseptic environment. In some embodiments, the beverage composition may be filled into the desired beverage container, such as a glass bottle, and then subjected to the pasteurization conditions.

Alternatively, in some embodiments, the beverage composition may be hot filled into the desired beverage container. More specifically, the beverage composition may be filled into the beverage container at a temperature sufficient to sterilize the composition in the container, for example about 85° C. (185° F.). After several minutes, the container and composition may be cooled down to about 32 to about 38° C. (about 90 to about 100° F.).

In some other embodiments, the beverage composition may be cold filled into the desired beverage container. In such embodiments, it may be desirable to add preservatives to the beverage composition. More specifically, cold-filling the beverage involves adding the beverage composition to the beverage container at a temperature of about 21° C. (70° F.). Preservatives, such as sodium benzoate and/or potassium sorbate, may be added to the composition to lower the pH of the composition. Desirable pH values may be about 3 to about 4.5. Cold-filling with preservatives may be used in some embodiments as an alternative to pasteurization.

In some embodiments, filling a container is conducted without the use of screens. Although screens are sometimes employed to reduce the oxygen exposure of a beverage during filling, the present inventor has found that the tomato concentrate of the beverages unexpectedly reduces the oxygen-sensitivity of the remaining components of the beverage, allowing bottling without the use of one or more screens. Thus, in some embodiments, the ready-to-drink beverage is bottled without the use of a screen. And another embodiment is a method of oxidatively stabilizing beer, comprising combining beer with a tomato-flavored concentrate to produce a ready-to-drink beverage comprising at least 0.1 weight percent natural tomato soluble solids, and bottling the ready-to-drink beverage. The natural tomato soluble solids content of the ready-to-drink beverage may be at least about 0.3 weight percent, or at least about 0.5 weight percent.

The beverage may be prepared as a fountain beverage. In other words, one or more single servings of the beverage may be prepared for immediate consumption (for example, in response to a customer order) by blending a specially formulated beverage concentrate with water containing a dissolved gas. Thus, one embodiment is fountain beverage composition comprising tomato solids; ethyl alcohol; a hops flavor; a flavoring agent selected from the group consisting of savory flavors, citrus flavors, spicy flavors, shellfish flavors, and combinations thereof; and water comprising dissolved gas.

Another embodiment is a method of preparing a tomato-flavored alcoholic beverage, comprising: blending one part by weight of a beverage concentrate with about 5 to about 10 parts by weight of water comprising dissolved gas; wherein the beverage concentrate comprises tomato solids, ethyl alcohol, a hops flavor, and a flavoring agent selected from the group consisting of savory flavors, citrus flavors, spicy flavors, shellfish flavors, and combinations thereof. The dissolved gas may be carbon dioxide, nitrogen, nitrous oxide, oxygen, or a combination thereof. The beverage concentrate may, optionally, further comprise fruit or vegetable juice and/or solids other than those derived from tomatoes. For example, the beverage concentrate may incorporate juice and/or solids derived from beets, carrots, celery, apples, peppers, onions, parsley, lettuce, watercress, arugula, spinach, pineapples, oranges, guavas, mangos, papayas, and the like, and combinations thereof.

One embodiment is a method of preparing a tomato-flavored alcoholic beverage, comprising: blending one part by weight of a beverage concentrate with about 5 to about 10 parts by weight of water comprising dissolved gas; wherein the beverage concentrate comprises about 20 to about 65 weight percent soluble solids, about 10 to about 50 weight percent ethyl alcohol, a hops flavor, and a flavoring agent selected from the group consisting of savory flavors, citrus flavors, spicy flavors, shellfish flavors, and combinations thereof; and wherein the water comprising dissolved gas comprises about 2 to about 5 volumes of a gas selected from the group consisting of carbon dioxide, nitrogen, nitrous oxide, oxygen, and combinations thereof. The beverage concentrate may, optionally, further comprise juice and/or solids derived from beets, carrots, celery, apples, peppers, onions, parsley, lettuce, watercress, arugula, spinach, pineapples, oranges, guavas, mangos, papayas, and the like, and combinations thereof.

The fountain beverages, the concentrates used to prepare the fountain beverage, and the methods used to prepare the fountain beverages are all embodiments of the invention.

One embodiment is a beverage composition comprising a tomato-flavored composition, and a hops-flavored composition, wherein the beverage composition is a pre-mixed, ready-to-drink beverage product.

One embodiment is a bottled, ready-to-drink tomato-flavored beverage product comprising beer and tomato paste, wherein the beverage comprises about 3 to about 20% soluble solids by weight.

One embodiment is a beverage composition comprising a stabilized dispersion of tomato paste in a beer composition.

One embodiment is a ready-to-drink beverage composition comprising about 0.3 to about 1 weight percent natural tomato soluble solids, about 0.1 to about 8 weight percent ethyl alcohol, and a flavoring agent selected from the group consisting of hops flavors, savory flavors, citrus flavors, spicy flavors, shellfish flavors, and combinations thereof.

One embodiment is a ready-to-drink beverage composition comprising about 0.3 to about 1 weight percent natural tomato soluble solids, about 0.1 to about 8 weight percent ethyl alcohol, and a shellfish flavor.

One embodiment is a fountain beverage composition, comprising: tomato solids; ethyl alcohol; a flavoring agent selected from the group consisting of savory flavors, citrus flavors, spicy flavors, shellfish flavors, hops flavors, and combinations thereof; and water comprising dissolved gas; wherein the beverage comprises about 2 to about 5 volumes of the dissolved gas; and wherein the water comprising dissolved gas is added at the point of consumption.

One embodiment is a method of preparing a tomato-flavored alcoholic composition, comprising: providing an alcoholic composition, and dispersing a tomato-flavored concentrate in the alcoholic composition, wherein the tomato-flavored concentrate comprises about 20 to about 65% soluble solids by weight, and wherein the weight ratio of tomato-flavored concentrate to alcoholic composition is about 1:20 to about 20:1.

One embodiment is a method of preparing a tomato-flavored alcoholic beverage, comprising: blending one part by weight of a beverage concentrate with about 5 to about 10 parts by weight of water comprising dissolved gas, wherein the beverage concentrate comprises tomato solids, ethyl alcohol, and a flavoring agent selected from the group consisting of savory flavors, citrus flavors, spicy flavors, shellfish flavors, hops flavors, and combinations thereof.

One embodiment is a method of preparing a tomato-flavored alcoholic beverage, comprising: blending one part by weight of a beverage concentrate with about 5 to about 10 parts by weight of water comprising dissolved gas; wherein the beverage concentrate comprises a tomato component having a natural tomato soluble solids content of about 20 to about 40% by weight, about 10 to about 50 weight percent ethyl alcohol, and a flavoring agent selected from the group consisting of savory flavors, citrus flavors, spicy flavors, shellfish flavors, hops flavors, and combinations thereof; and wherein the water comprising dissolved gas comprises about 2 to about 5 volumes of a gas selected from the group consisting of carbon dioxide, nitrogen, nitrous oxide, oxygen, and combinations thereof.

One embodiment is a method of oxidatively stabilizing beer, comprising combining beer with a tomato-flavored concentrate to produce a ready-to-drink beverage comprising at least 0.1 weight percent natural tomato soluble solids, and bottling the ready-to-drink beverage.

EXAMPLES

Example 1

TABLE 1

| Tomato-Flavored Beer | |
|---|---|
| Component | % by weight |
| Tomato-flavored composition | 33 |
| Light beer | 67 |

A tomato-flavored beer is prepared according to the formulation in Table 1 above.

To prepare the tomato-flavored beer, a light beer composition is provided. Any conventional light beer (or regular beer) may be used. The light beer is an alcoholic as well as a hops-flavored composition, which may include water, barley, malt, hops and yeast, among other ingredients.

A tomato-flavored composition, such as a tomato concentrate, also is provided. The tomato concentrate may include tomato paste, clam flavor, spicy flavoring agents, salts, a sweetening agent, a food-grade acid, such as citric acid, a coloring agent, such as Allura red, and various other flavoring agents. The tomato paste may be homogenized for about 2 minutes at pressures of about 6.9 to about 27.6 megapascals (about 1000 to about 4000 pounds per square inch) using a homogenizer prior to addition of the other components contained in the concentrate.

The tomato concentrate may be added to the light beer composition in the amounts indicated in Table 1 above. More specifically, the tomato concentrate may be mixed into and dispersed throughout the beer composition to provide a uniform mixture. Water also may be added to the mixture. The tomato-flavored beer composition may be heated to about 60 to about 80° C. for about 6 to about 15 minutes in an aseptic environment to sterilize the composition. Subsequently, the pasteurized composition may be filled into individual beverage containers, such as glass bottles or cans, to provide an RTD tomato-flavored beer product.

Example 2

This example describes the preparation of a beverage concentrate suitable for use in preparing a beverage by blending with beer and, optionally, additional water. The beverage concentrate was prepared by blending components and relative amounts as listed in Table 2. The tomato paste was a hot break tomato paste containing 31% natural tomato soluble solids. Component amounts in weight percent (wt %) are based on the total weight of the concentrate. Components were added to blend in the order listed in Table 2. After all components were added and blended, the concentrate was homogenized at a pressure of 13.8±1.4 megapascals (2000±200 pounds per square inch).

The final concentrate had a specific gravity at 20° C. of 1.1175, an apparent density at 20° C. of 1.1143 grams per milliliter, refractometer brix solids of 26.10 brix, a citric acid acidity of 2.0 grams per 100 grams, a pH of 3.8, and 90 volume percent insoluble solids. The volume percent insoluble solids were determined after centrifuging 50 milliliter samples the concentrate at 1609 rotations per minute for 10 minutes in a centrifuge with a 25.4 centimeter diameter.

The concentrate preferably contains fewer than 500 bacteria per gram, fewer than 100 yeast per gram, and fewer than 100 mold per gram. Microbiological tests may be conducted using potato dextrose agar or malt extract agar.

The refrigerated shelf life may be at least about 2 to 3 weeks, and that shelf life may be extended to at least about 4 to 6 weeks by adding preservatives such as potassium sorbate and/or sodium benzoate.

TABLE 2

| Beverage Concentrate | |
|---|---|
| Component | % by Weight |
| Water | 54.4127 |
| High fructose corn syrup 42, 71% solids | 17.8171 |
| Tomato paste, hot break, 31 NTSS | 20.2270 |
| Clam Broth Powder | 0.0385 |
| Monosodium glutamate | 3.1297 |
| Salt | 2.1425 |
| Citric acid | 17.97 |
| Spice blend | 0.2057 |
| Pepper sauce | 0.2146 |
| Food dyes | 0.0085 |
| Jalapeno flavor | 0.1699 |
| Citrus flavor | 0.0268 |

Example 3

This example describes the preparation of a ready-to-drink beverage from beverage concentrate, beer, water, and carbon dioxide. The concentrate described in Example 2 is blended with water, strong beer containing 7 volume percent alcohol, and carbon dioxide in the proportions listed in Table 3 to prepare a beverage containing 4.8% by volume alcohol and having a specific gravity at 20° C. of 1.0184 grams per milliliter, an apparent density at 20° C. of 1.0155 grams per milliliter, refractometer brix solids of 7.8 brix, a citric acid acidity of 0.3 grams per 100 grams, a pH of 4.1, 2.7 volumes of carbon dioxide, and 15 volume percent insoluble solids.

After carbonation, the beverage may be packaged, for example by filling amber glass bottles with about 341 to about 348 milliliters of beverage and sealing the bottles with a cap removable with a torque of 0.68±0.34 newton-meter (6±3 inch-pounds). After packaging, the beverage may be pasteurized with the equivalent of about 200 to about 400 pasteurization units. For example, the beverage may be pasteurized for about 12 minutes at a temperature of at least 70° C. (330 pasteurization units). The beverage after pasteurization may contain fewer than 500 bacteria per milliliter fewer than 1 yeast per milliliter, and fewer than 1 mold per milliliter.

TABLE 3

Ready-to-Drink Beverage

| Component | Amount |
| --- | --- |
| Beer, 7% by volume alcohol | 68.60 vol. % |
| Water | 21.40 vol. % |
| Example 2 Beverage Concentrate | 10.00 vol. % |
| Carbon Dioxide | 2.7 volumes |

Examples 4-8

These examples illustrate five beverage concentrate formulations. Using the components and amounts (in percent by weight) presented in Table 4, the concentrate is prepared by mixing the ingredients in the order listed and homogenizing the mixture at 2000 psi. (In Table 4, the abbreviation "q.s." is used for the Latin "quantum sufficit" to indicate that water makes up the balance of each formulation.) The concentrate is then filled into suitable storage vessels and refrigerated until use.

TABLE 4

Concentrate Formulations

| | Ex. 4 | Ex. 5 | Ex. 6 | Ex. 7 | Ex. 8 |
| --- | --- | --- | --- | --- | --- |
| Water | q.s. | q.s. | q.s. | q.s. | q.s. |
| Corn Syrup | 15–20 | 15–20 | 15–20 | 15–20 | 15–20 |
| Tomato Paste | 17–25 | 17–25 | 17–25 | 17–25 | 17–25 |
| Clam Broth Powder | 0.01–0.10 | 0 | 0.01–0.10 | 0 | 0.01–0.10 |
| Shrimp Broth Powder | 0 | 0.01–0.10 | 0 | 0.01–0.10 | 0 |
| Monosodium Glutamate | 1–5 | 1–5 | 1–5 | 1–5 | 1–5 |
| Sodium Chloride | 1–5 | 1–5 | 1–5 | 1–5 | 1–5 |
| Spice Blend | 0.1–0.5 | 0.1–0.5 | 0.05–0.20 | 0.05–0.20 | 0.2–1.0 |
| Pepper Sauce | 0.1–0.5 | 0.1–0.5 | 0 | 0 | 0.1–0.5 |
| Citrus Flavor | 0.01–0.10 | 0.01–0.10 | 0.1–0.5 | 0.1–0.5 | 0 |
| Citric Acid | 1–3 | 1–3 | 1–5 | 1–5 | 0.05–0.10 |
| Color | 0.001–0.01 | 0.001–0.01 | 0.001–0.01 | 0.001–0.01 | 0.001–0.01 |

Examples 9-13

These examples illustrate five ready-to-drink beverage formulations prepared using the concentrates in Examples 4-8. Components and amounts (in percent by weight) are presented in Table 5. In Table 5, beer containing 8.0 volume percent ethanol is designated "Beer at 8.0% EtOH"; beer containing 5.0 volume percent ethanol is designated "Beer at 5.0% EtOH"; "Hops Flavor" is a concentrated hops flavor such as, for example the residue of a supercritical $CO_2$ extraction of dried hops. The beverage is prepared by mixing the ingredients in the order shown in a standard mixing vessel until blended and carbonating the mixture to 2.7 volumes of carbon dioxide. The beverage is then filled into bottles and pasteurized at 200-400 pasteurization units.

TABLE 5

Ready-to-Drink Beverage Formulations

| | Ex. 9 | Ex. 10 | Ex. 11 | Ex. 12 | Ex. 13 |
| --- | --- | --- | --- | --- | --- |
| Ex. 4 Concentrate | 10–20 | 0 | 0 | 0 | 0 |
| Ex. 5 Concentrate | 0 | 10–20 | 0 | 0 | 0 |
| Ex. 6 Concentrate | 0 | 0 | 10–20 | 0 | 0 |
| Ex. 7 Concentrate | 0 | 0 | 0 | 10–20 | 0 |
| Ex. 8 Concentrate | 0 | 0 | 0 | 0 | 10–20 |
| Beer at 8.0% EtOH | 65–75 | 0 | 65–75 | 0 | 0 |
| Beer at 5.0% EtOH | 0 | 70–85 | 0 | 70–85 | 0 |
| Hops Flavor | 0 | 0 | 0 | 0 | 0.5–5.0 |
| Water | q.s. | q.s. | q.s. | q.s. | q.s. |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The invention claimed is:

1. A beverage concentrate, consisting of:
   water;

a tomato paste having a natural tomato soluble solids content of about 24% to about 36% by weight present in an amount sufficient to provide a natural tomato soluble solids content of about 5.3 to about 7.8 weight percent in the concentrate as a whole;

a sweetening agent, a flavoring agent selected from the group consisting of shellfish flavors, savory flavors, citrus flavors, spicy flavors, and hops flavors, ethyl alcohol, and an additive selected from the group consisting of salts, food-grade acids, coloring agents, preservatives, ascorbic acid, energy-boosting agents, vitamins, and combinations thereof;

wherein the concentrate comprises about 35 to about 65% soluble solids by weight;

wherein the beverage concentrate comprises about 75 to about 95 volume percent insoluble solids.

2. A beverage concentrate, consisting of:

water;

15 to 20 weight percent corn syrup;

17 to 25 weight percent tomato paste;

0.01 to 0.10 weight percent clam broth powder;

1 to 5 weight percent monosodium glutamate;

1 to 5 weight percent sodium chloride;

0.01 to 0.10 weight percent of citrus flavor;

1 to 3 weight percent of citric acid; and 0.001 to 0.01 weight percent of food coloring;

a preservative selected from the group consisting of sodium benzoate, potassium sorbate and combinations thereof;

wherein the concentrate comprises about 35 to about 65% soluble solids by weight;

wherein the beverage concentrate has a refrigerated shelf life of about 4 to 6 weeks;

wherein the tomato paste provides a natural tomato soluble solids content of about 5.3 to about 7.8 weight percent in the concentrate as a whole;

wherein all weight percents are based on the total weight of the beverage concentrate.

3. The beverage concentrate of claim 1, wherein the citrus flavors are selected from the group consisting of lemon, lime, orange, grapefruit, tangerine, and combinations thereof.

4. The beverage of claim 1 wherein the sweetening agent is a sugarless sweetener.

5. The beverage of claim 1 wherein the sweetening agent is high fructose corn syrup.

6. The beverage of claim 1 wherein the shellfish flavors are selected from the group consisting of clam, oyster, shrimp, lobster, crab, mollusk, mussels, scallops, and combinations thereof.

7. The beverage of claim 1 wherein the food-grade acids are selected from the group consisting of acetic acid, adipic acid, ascorbic acid, butyric acid, citric acid, formic acid, fumaric acid, glyconic acid, lactic acid, malic acid, phosphoric acid, oxalic acid, succinic acid, tartaric acid and combinations thereof.

8. The beverage of claim 1 wherein the savory flavors are selected from the group consisting of onion flavor, garlic flavor, celery seed, anchovy flavor, ginseng, taurine, guarana, Worcestershire flavor, soy sauce flavor, yeast extract flavor, beef flavor, dill, carrot, parsley, beet, lettuce, watercress, arugula, spinach, and combinations thereof.

* * * * *